United States Patent
Mueller et al.

(10) Patent No.: US 12,162,550 B2
(45) Date of Patent: Dec. 10, 2024

(54) VIBRATION DAMPER SYSTEM FOR A STEERING WHEEL ARRANGEMENT OF A MOTOR VEHICLE

(71) Applicant: Joyson Safety Systems Germany GmbH, Aschaffenburg (DE)

(72) Inventors: Norbert Mueller, Aschaffenburg (DE); Bernhard Kempf, Kleinwallstadt (DE); Louis Winter, Hösbach (DE); Sebastian Beck, Aschaffenburg (DE)

(73) Assignee: Joyson Safety Systems Germany GmbH, Aschaffenburg (DE)

( * ) Notice: Subject to any disclaimer, the term of this patent is extended or adjusted under 35 U.S.C. 154(b) by 290 days.

(21) Appl. No.: 17/610,655

(22) PCT Filed: May 14, 2020

(86) PCT No.: PCT/EP2020/063503
§ 371 (c)(1),
(2) Date: Nov. 11, 2021

(87) PCT Pub. No.: WO2020/229615
PCT Pub. Date: Nov. 19, 2020

(65) Prior Publication Data
US 2022/0204080 A1    Jun. 30, 2022

(30) Foreign Application Priority Data

May 15, 2019   (DE) .................... 10 2019 207 069.8
Feb. 12, 2020  (DE) .................... 10 2020 201 752.2

(51) Int. Cl.
*F16F 7/10* (2006.01)
*B62D 7/22* (2006.01)
*F16F 7/104* (2006.01)

(52) U.S. Cl.
CPC .............. *B62D 7/222* (2013.01); *F16F 7/104* (2013.01); *F16F 2222/08* (2013.01)

(58) Field of Classification Search
CPC ........ B62D 7/222; F16F 7/104; F16F 2222/08
(Continued)

(56) References Cited

U.S. PATENT DOCUMENTS

| 5,931,492 A | 8/1999 | Mueller et al. | |
| 7,758,027 B2 * | 7/2010 | Yama ...................... | F16F 1/128 267/293 |

(Continued)

FOREIGN PATENT DOCUMENTS

| CN | 101550977 A | 10/2009 |
| CN | 101643009 A | 2/2010 |

(Continued)

OTHER PUBLICATIONS

International Preliminary Report on Patentability and Written Opinion for Application No. PCT/EP2020/063503; dated Nov. 16, 2021.

(Continued)

*Primary Examiner* — Christopher P Schwartz
(74) *Attorney, Agent, or Firm* — Fitch, Even, Tabin & Flannery LLP

(57) ABSTRACT

It is provided a vibration damper system for a steering wheel arrangement of a motor vehicle, which is provided for arrangement on a steering wheel element of the steering wheel arrangement. The vibration damper system comprises a vibration damping mass for damping the vibration of the steering wheel arrangement, an elastic bearing element which comprises a fastening element for fastening the elastic bearing element to one of bearing element and vibration damping mass, and a fastening means for fastening to the (Continued)

other of steering wheel element and vibration damping mass, wherein the elastic bearing element sectionally rests against the fastening means.

10 Claims, 3 Drawing Sheets

(58) Field of Classification Search
USPC ............ 267/140.13, 141.1–141.7, 292–294;
296/35.1; 403/220; 280/731
See application file for complete search history.

(56) References Cited

U.S. PATENT DOCUMENTS

| | | | |
|---|---|---|---|
| 9,550,525 | B2 | 1/2017 | Ishii et al. |
| 11,718,257 | B2 * | 8/2023 | McMillan ........... B60R 21/2037 280/731 |
| 2004/0026908 | A1 | 2/2004 | Schneider et al. |
| 2009/0218739 | A1 | 9/2009 | Terada et al. |
| 2009/0243172 | A1 | 10/2009 | Ting et al. |
| 2015/0107948 | A1 | 4/2015 | Gustavsson |
| 2016/0114752 | A1 | 4/2016 | Banno |
| 2017/0088171 | A1 | 3/2017 | Ishii et al. |
| 2017/0144594 | A1 | 5/2017 | Obayashi |
| 2019/0217800 | A1 | 7/2019 | McMillan et al. |
| 2020/0339192 | A1 | 10/2020 | Myklebust |
| 2021/0269080 | A1 * | 9/2021 | Kim .................... B60R 21/2037 |
| 2023/0174153 | A1 * | 6/2023 | Johansson ................ F16F 1/38 280/731 |

FOREIGN PATENT DOCUMENTS

| | | |
|---|---|---|
| CN | 106536322 A | 3/2017 |
| CN | 109070830 A | 12/2018 |
| DE | 19724029 A1 | 12/1998 |
| DE | 10226092 A1 | 1/2004 |
| DE | 102015009882 A1 | 2/2016 |
| DE | 102017126156 B3 | 1/2019 |
| EP | 2085290 B1 | 1/2011 |
| EP | 2662588 B1 | 9/2016 |
| EP | 3499076 A1 | 6/2019 |
| KR | 20020031810 A | 5/2002 |

OTHER PUBLICATIONS

German Patent Office; Application No. 10 2020 201 752.2; Office Action dated Dec. 15, 2021.
CNIPA; Application No. 202080005254.6; First Office Action dated Jun. 1, 2023.

* cited by examiner

VIBRATION DAMPER SYSTEM FOR A STEERING WHEEL ARRANGEMENT OF A MOTOR VEHICLE

CROSS-REFERENCE TO A RELATED APPLICATION

This application is a National Phase Patent Application of International Patent Application Number PCT/EP2020/063503, filed on May 14, 2020, which claims priority of German Patent Application Number 10 2019 207 069.8, filed on May 15, 2019 and of German Patent Application Number 10 2020 201 752.2, filed on Feb. 12, 2020.

BACKGROUND

This disclosure relates to a vibration damper system for a steering wheel arrangement of a motor vehicle.

Vibration damper systems are used for damping vibrations which are generated in operation of the motor vehicle and in particular are transmitted to the steering wheel arrangement via a steering column. For this purpose, vibration damper systems can be arranged on a steering wheel element of the steering wheel arrangement. Known vibration damper systems usually comprise a vibration damping mass. The vibration damping mass can be provided for example by a gas generator of an airbag module. In dependence on the amount of the vibration damping mass, the resonance frequency of the steering wheel arrangement can be shifted, for example into a frequency range below 30 Hz. For this purpose, the vibration damping mass is vibrationally coupled with a steering wheel element of the steering wheel arrangement via mechanical components.

SUMMARY

The problem underlying the proposed solution consists in creating a vibration damper system whose components are easy to manufacture and assemble.

This problem is solved by a vibration damper system with features as described herein.

Accordingly, the vibration damper system for a steering wheel arrangement of a motor vehicle initially comprises a vibration damping mass for damping the vibration of the steering wheel arrangement. To connect the vibration damping mass to a steering wheel element of the steering wheel arrangement, the vibration damper system furthermore comprises an elastic bearing element and a fastening means separate from the elastic bearing element. The elastic bearing element itself comprises a fastening element for fastening the elastic bearing element to the one of bearing element and vibration damping mass. The separate fastening means is provided for fastening to the other of steering wheel element and vibration damping mass. The fastening means for example can be a screw. In the properly arranged state, the elastic bearing element sectionally rests against the fastening means (for example against the screw head). In particular, the fastening element of the elastic bearing element sectionally rests against the fastening means.

The elastic bearing element with its fastening element is fabricated in one piece from an elastic material. The material can be silicone, for example. The elastic bearing element on the one hand adopts the function of vibration damping and on the other hand the function of fastening. Due to geometry of the elastic bearing element, the resonance frequency of the entire vibration damper system and hence of the steering wheel arrangement, which is equipped with the vibration damper system of the proposed solution, can be adjusted.

According to one embodiment, the elastic bearing element comprises an annular bearing portion with two opposite sides. The two opposite sides extend in substantially parallel planes which are aligned substantially perpendicularly to a main axis of extension of the elastic bearing element. In the properly arranged state, the first side of the annular bearing portion faces the one of vibration damping mass and steering wheel element, and the second side faces the other of vibration damping mass and steering wheel element. The fastening element is formed on the first side of the bearing portion.

It can be provided that the fastening element of the elastic bearing element comprises a plurality of pins which are arranged along the circumferential edge of the annular bearing portion (on its first side) and each protrude from the first side of the bearing portion along an axis which is aligned substantially parallel to the main axis of extension of the elastic bearing element. Each pin can include a protrusion directed radially to the outside with respect to said axis. As seen along said axis, the protrusions are arranged at a distance to the annular bearing portion. For example, the protrusions each are arranged at an end of one of the pins which faces away from the annular bearing portion. Between the annular bearing portion and the protrusions directed radially to the outside, there is obtained a receiving area for receiving (and ultimately for fastening) the steering wheel element or the vibration damping mass. Thus, the elastic bearing element can be fastened to the steering wheel element or to the vibration damping mass by clamping the steering wheel element or the vibration damping mass between the annular bearing portion of the elastic bearing element and the protrusions of the elastic bearing element directed radially to the outside. The compressive force which is exerted on the steering wheel element or the vibration damping mass by the annular bearing portion of the elastic bearing element and by the protrusions of the elastic bearing element, which are directed radially to the outside, can be adjustable by the fastening means.

For fastening the vibration damping mass or the steering wheel element to the elastic bearing element, the pins can be configured to extend through an opening in the vibration damping mass or the steering wheel element and to engage behind the protrusions directed radially to the outside, the vibration damping mass or the steering wheel element. Thus, the vibration damping mass or the steering wheel element can rest against the outside of the pins of the elastic bearing element.

Furthermore, it can be provided that the elastic bearing element includes an opening which is surrounded by the annular bearing portion. The opening forms a feed-through opening from the first side to the second side of the annular bearing portion. The pins are arranged around the opening and together with the annular bearing portion form a substantially cylindrical body. The same can serve to receive a portion of the fastening means, for example the shank of a screw.

Furthermore, the elastic bearing element can include a sleeve which is arranged on the first side of the annular bearing element and in particular extends along the main axis of extension of the elastic bearing element. The sleeve can have an inside diameter which is equal to or greater than the diameter of the opening of the elastic bearing element. The sleeve and the opening of the elastic bearing element can be arranged coaxially so that the sleeve and the opening of the elastic bearing element (with the same diameter)

together form a hollow cylinder. In particular, it can be provided that the pins are formed on an outer surface of the sleeve. The sleeve can be understood as a ring-shaped band which connects the individual pins to each other. The sleeve can have a smaller height (expansion along the main axis of extension of the elastic bearing element) than the pins.

On the first side of the annular bearing portion of the elastic bearing element, there can furthermore be formed punctual elevations or protrusions which are arranged radially outside of the pins. The protrusions have a smaller height (expansion along the main axis of extension of the elastic bearing element) than the pins. The protrusions for example can have a first shape or a second shape. The protrusions of the first shape and of the second shape can be arranged in alternation. In particular, the protrusions of the first shape have a larger height (expansion along the main axis of extension of the elastic bearing element) than the protrusions of the second shape. In the properly arranged state of the elastic bearing element and the one of bearing element and vibration damping mass, which is/are attached to the fastening element of the elastic bearing element, the steering wheel element or the vibration damping mass can rest on the protrusions of the first shape (and at the same time rest against a portion of the pins).

In addition to the elastic bearing element and the fastening means, the vibration damper system can comprise a sleeve element. The sleeve element can have an oblong shape and extend along a main axis of extension of the sleeve element. The sleeve element can have a central cylindrical portion. Furthermore, the sleeve element can have an annular bearing portion which extends in a plane perpendicular to the main axis of extension of the sleeve element and which has a first side and a second side opposite the first side. In the properly arranged state, the main axis of extension of the sleeve element can extend along the main axis of extension of the elastic bearing element. The sleeve element can protrude through the opening of the elastic bearing element. In the properly arranged state, the first side of the annular bearing portion of the sleeve element can rest against the second side (i.e. the side facing away from the pins) of the annular bearing portion of the elastic bearing element. In addition, the central cylindrical portion of the sleeve element can rest against an inside (or against a portion of the inside) of the sleeve of the elastic bearing element or of the pins of the elastic bearing element. The pins for example can include an end portion facing the annular bearing portion of the elastic bearing element, which is designed in such a way that in the properly arranged state it rests against the central cylindrical portion of the sleeve element, whereas in the properly arranged state a free end portion of the pins (which faces away from the annular bearing portion of the elastic bearing element) is spaced apart from the central cylindrical portion of the sleeve element. This spacing can be determined in particular by the material thickness of the sleeve of the elastic bearing element.

It is conceivable that on the second side of the annular bearing portion of the sleeve element, which faces away from the elastic bearing element, there is provided a receptacle for a spring element. Moreover, the vibration damper system can comprise a spring element which in the properly arranged state is arranged between the second side of the annular bearing portion of the sleeve element and the vibration damping mass or the steering wheel element (in said receptacle). The spring element for example can be configured as a coil spring. Alternatively, the spring element can be manufactured from an elastic material and for example have a substantially hollow cylindrical shape.

According to one embodiment, the sleeve element is formed in one piece. In particular, it can be manufactured from a non-elastic material.

The sleeve element can serve to receive the fastening means. For example, the sleeve element can protrude through the opening of the elastic bearing element, and the fastening means can protrude through the sleeve element. The sleeve element (in particular its central cylindrical portion) and the elastic bearing element (in particular its pins) can be dimensioned in such a way that in the properly arranged state the sleeve element extending along the main axis of extension of the sleeve element does not extend beyond the end of the pins of the elastic bearing element facing away from the annular bearing portion of the elastic bearing element. Furthermore, in the properly arranged state, the elastic bearing element on the one hand can rest against the first side of the annular bearing portion of the sleeve element (with the second side of its annular bearing portion) and on the other hand against the fastening means (with the end of the pins facing away from the annular bearing portion of the elastic bearing element). The elastic bearing element can exert a compressive force on the first side of the annular bearing portion of the sleeve element and on the fastening means.

For fastening the sleeve element to the elastic bearing element, the sleeve element can include a protrusion, and the elastic bearing element can include a corresponding groove for receiving the protrusion. When fastening the sleeve element to the elastic bearing element, the deformability of the elastic bearing element can be made use of.

BRIEF DESCRIPTION OF THE DRAWINGS

The solution will be explained in detail below by means of exemplary embodiments with reference to the Figures.

DETAILED DESCRIPTION

Figure 1:
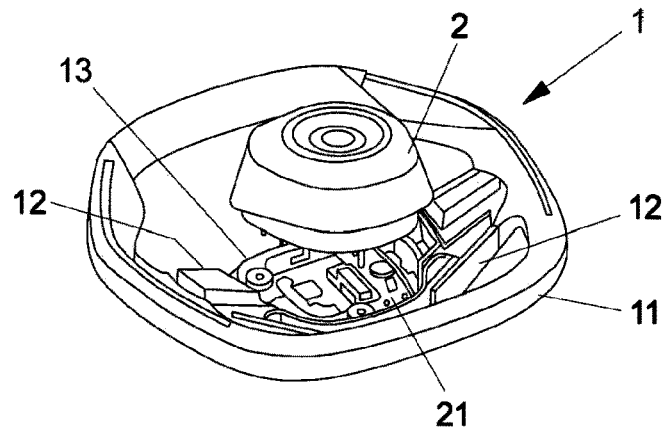
FIG. 1 shows a perspective view of a steering wheel arrangement and of an airbag module for attachment to the steering wheel arrangement as a vibration damping mass.

FIG. 1 shows a perspective representation of a steering wheel arrangement 1. The steering wheel arrangement 1 comprises a steering wheel rim 11 which is attached to a central steering wheel hub 13 via steering wheel spokes 12. Furthermore, there is shown an airbag module 12 which can be attached to the steering wheel hub 13 by means of a contact bridge 21. In FIG. 1, the steering wheel arrangement 1 and the airbag module 2 are not shown attached to each other. The contact bridge 21 is fixed to the steering wheel hub 13 of the steering wheel arrangement 1 by means of various components of a vibration damper system 3, which will be explained in detail with reference to the following Figures.

Figure 2:
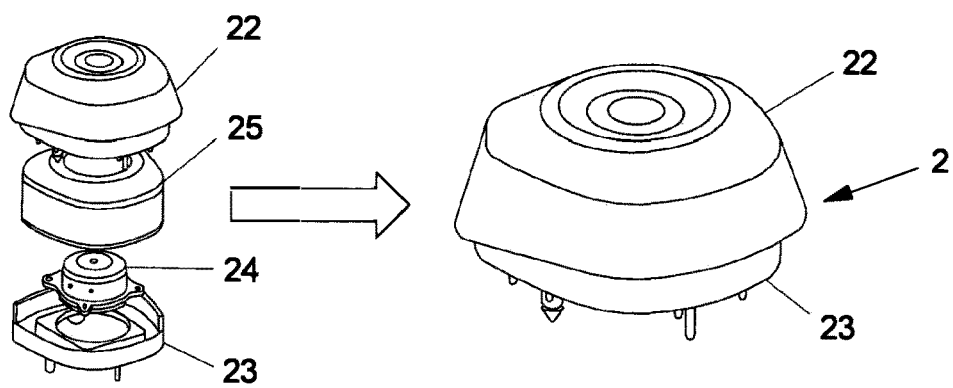
FIG. 2 shows an exploded representation and a perspective representation of the airbag module of FIG. 1.
Figure 3:
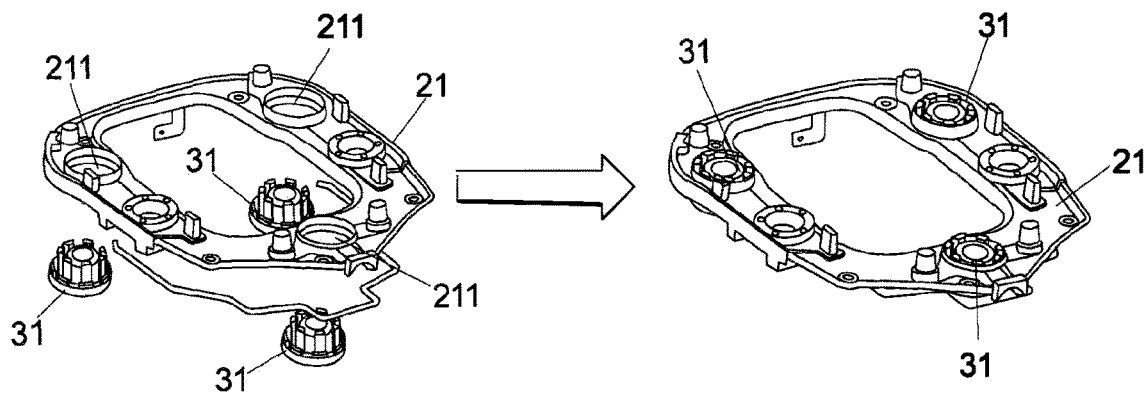
FIG. 3 shows a contact bridge for fastening an airbag module to a steering wheel element together with three elastic bearing elements and sleeve elements of a vibration damper system according to an embodiment.

FIG. 2 shows the airbag module 2 of FIG. 1 in an exploded representation (on the left) and in a perspective view (on the right). The airbag module 2 comprises a housing upper part 22 and a housing lower part 23 which together enclose a gas generator 24 and a gas bag 25. The housing lower part 23 is connectable to the contact bridge 21. The contact bridge 21 is shown in FIG. 3. The contact bridge 21 comprises (here for example three) feed-through openings 211, in each of which an elastic bearing element 31 of the vibration damper system 3 can be arranged. The contact bridge 21 has a planar structure, and the feed-through openings 211 are arranged uniformly distributed over the circumferential edge of the contact bridge 21.

Figure 4:
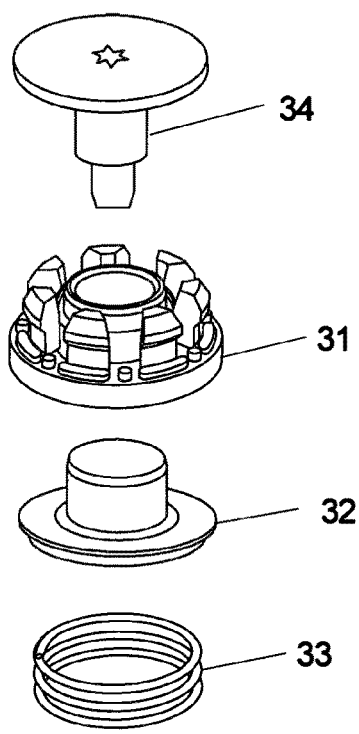
FIG. 4 shows a representation of components of a vibration damper system according to an embodiment.

FIG. 4 shows four components of the vibration damper system 3 in an exploded representation. The elastic bearing element 31 mentioned already is a central part of the vibration damper system 3. Furthermore, the vibration damper system 3 comprises a sleeve element 32, a spring element 33 and a fastening means 34. In addition, the vibration damper system 3 comprises a vibration damping mass. It is the object of the components of the vibration damper system 3 shown in FIG. 4 to fasten the vibration damping mass to a steering wheel element of the steering wheel arrangement 1 so that the vibration damping mass can damp the vibrations of the steering wheel element, i.e. can shift the same into a particular frequency range and/or absorb the same. According to the proposed solution, the vibration damping mass is provided by the airbag module 2 and the contact bridge 21. In the present case, the steering wheel element to which the vibration damping mass is to be fastened is the steering wheel hub 13 (FIG. 1). The components (elastic bearing element 31, sleeve element 32, spring element 33 and fastening means 34) of the vibration damper system 3 as shown in FIG. 4 can be understood as a set which can be provided in the vibration damper system 3 in any number. On the other hand, there can be provided a single vibration damping mass.

Figure 5:
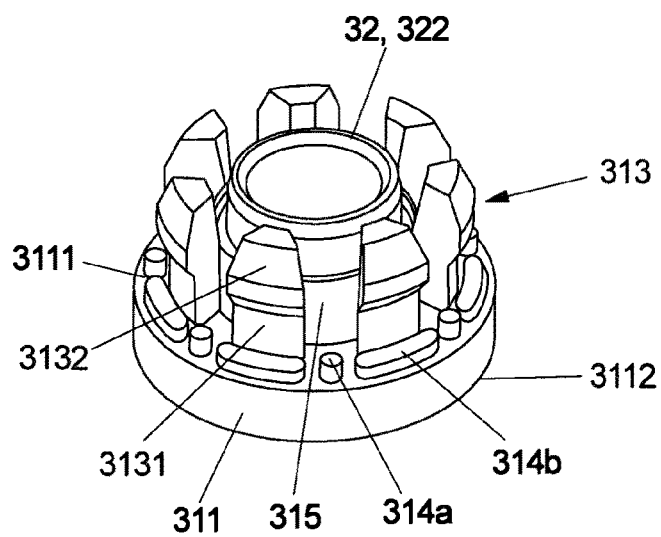
FIG. 5 shows a perspective representation of the elastic bearing element and the sleeve element of FIG. 4 in the state properly arranged relative to each other.
Figure 6:
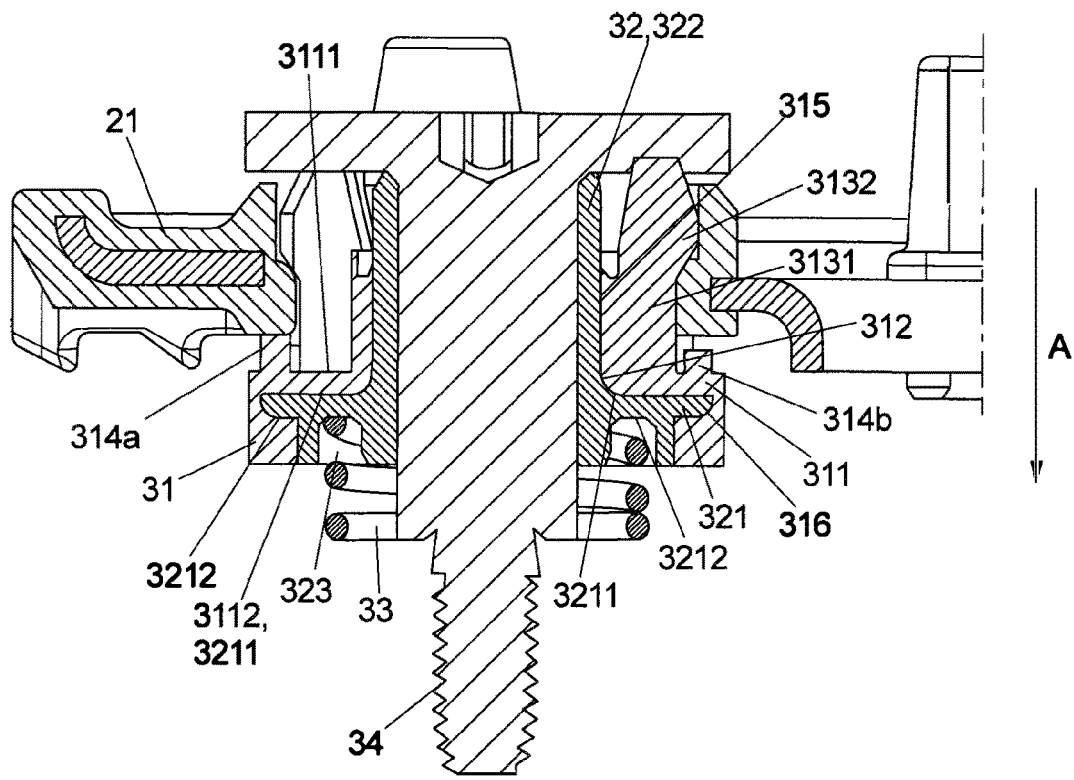
FIG. 6 shows a section through the components of the vibration damper system of FIG. 4 along with the contact bridge of FIG. 3 in the state properly arranged relative to each other.

The elastic bearing element 31 now will be explained in detail with reference to FIGS. 4 to 6. The elastic bearing element 31 is fabricated in one piece from an elastic material. The elastic bearing element 31 comprises an annular bearing portion 311. This bearing portion 311 has a first side 3111 and a second side 3112 which faces the first side 3111. The elastic bearing element 31 comprises an opening 312 which is surrounded by the annular bearing portion 311. In other words, the annular bearing portion 311 defines the boundary of the opening 312. The opening 312 forms a feed-through opening which penetrates the annular bearing portion 311 from its first side 3111 to its second side 3112. In the embodiment of FIGS. 4 to 6, the opening 312 has a circular cross-section and the bearing portion 311 has the shape of a circular ring. However, other shapes are also imaginable. On the first side 3111 of the annular bearing portion 311 a fastening element 313 is formed. The fastening element 313 comprises a plurality of pins 3131. The pins 3131 are arranged along the circumferential edge of the annular bearing portion 311 and each protrude from the first side 3111 of the annular bearing portion 311. As can be seen in FIG. 5, the pins 3131 are arranged on a circular path. Between two adjacent pins 3131 a spacing each is provided (on this circular path). The pins 3131 extend parallel to an axis A which extends from the first side 3111 to the second side 3112 of the annular bearing portion 311. The pins 3131 in particular are arranged around the axis A. On each pin 3131 there is formed a protrusion 3132 which is directed radially to the outside with respect to the axis A. The protrusion 3132 can be formed at the end of the pin 3131 facing away from the first side 3111 of the annular bearing portion 311. The protrusions 3132 on the one hand and the first side 3111 of the annular bearing portion 311 on the other hand together form a receiving area for receiving the one of steering wheel element (steering wheel hub 13) and vibration damping mass (airbag module 2 with the contact bridge 21). In this embodiment, as shown in FIG. 6, the receiving area between the protrusions 3132 and the first side 3111 of the annular bearing portion 311 serves to receive the contact bridge 21 of the airbag module. The pins 3131 of an elastic bearing element 31 protrude through one of the feed-through openings 211 of the contact bridge 21, and the protrusions 3132 directed radially to the outside engage behind the contact bridge 21.

On the first side 3111 of the annular bearing portion 311 there are furthermore formed elevations 314 which protrude from the first side 3111 along the axis A. The elevations 314a, b have a smaller height (along the axis A) than the pins 3131 so that the pins 3131 protrude beyond the elevations 314a, b. The elevations 314a, b are arranged radially outside of the pins 3131. The elevations 314a, b have two different shapes, wherein the elevations of the first shape 314a and the elevations of the second shape 314b alternate. The elevations of the first shape 314a are higher than the elevations of the second shape 314b. In the properly arranged state, the contact bridge 21 rests on the elevations of the first shape 314a (FIG. 6). The elevations of the second shape 314b are located outside of the pins 3131 in a radial direction. The elevations of the first shape 314a are located outside of the spacing between two adjacent pins 3131 in a radial direction. The geometry of the elevations of the first shape 314a (i.e. of the higher elevations) has an influence on the resonance frequency of the vibration damper system 3. The height of the elevations of the second shape 314b (i.e. of the lower elevations) influences the stroke path of the vibration damping mass (contact bridge 21 with the airbag module 2) with respect to the steering wheel element. If a horn function can be triggered by applying pressure onto the airbag module 2, the elevations of the second shape 314b also influence the stroke path or the force to be applied for triggering the horn function.

In addition, a sleeve 315 protrudes from the first side 3111 of the annular bearing portion 311 along the axis A. The sleeve 315 is cylindrical and here by way of example has a circular cross-section. The cross-sectional area of the sleeve corresponds to the cross-sectional area of the opening 312 of the elastic bearing element 31. The opening 312 and the sleeve 315 are arranged coaxially. The sleeve 315 forms an extension of the opening 312 along the axis A. The pins 3131 have a larger height (expansion along the axis A) than the sleeve 315. Each of the pins 3131 sectionally rests against the outside of the sleeve 315. In particular, the pins 3131 and the sleeve 315 are integrally formed with each other.

The vibration damper system 3 furthermore comprises a sleeve element 32. The sleeve element 32 is an element separate from the elastic bearing element 31 and is not to be confused with the sleeve 315 of the elastic bearing element 31. The sleeve element 32—in contrast to the elastic bearing element 31—is made of a substantially non-elastic material. The sleeve element 32 is formed in one piece. The sleeve element 32 extends along a main direction of extension. In the state properly arranged with respect to the elastic bearing element 31, the same is parallel to the axis A. The sleeve element 32 has an annular bearing portion 321 which extends in a plane that is substantially perpendicular to the main axis of extension of the sleeve element 32. The annular bearing portion 321 encloses a central cylindrical portion 322 of the sleeve element 32. The annular bearing portion 321 has a first side 3111 and a second side 3212, which face each other. In the state properly arranged with the elastic bearing element 31, the first side 3211 of the annular bearing portion 312 of the sleeve element 32 rests against the second side 3112 of the annular bearing portion 311 of the elastic bearing element 31. Furthermore, in the state properly arranged with the elastic bearing element 31, the central cylindrical portion 322 of the sleeve element 32 sectionally rests against the sleeve 315 of the elastic bearing element 31. In the properly arranged state, the sleeve element 32 extends through the opening 312 of the elastic bearing element 31. The pins 3131 of the elastic bearing element 31 protrude beyond the central cylindrical portion 322 of the sleeve element (at least slightly).

Figure 7:
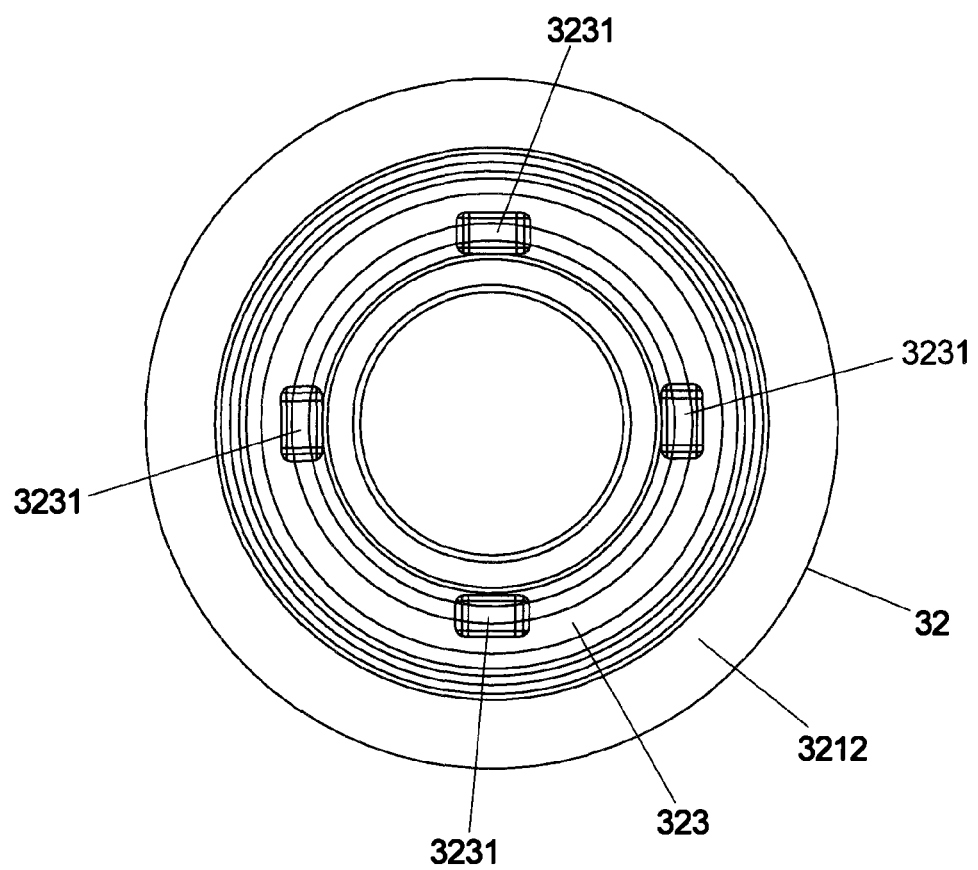
FIG. 7 shows a top view of the second side of the sleeve element of FIG. 4 on which a receptacle for the spring element of FIG. 4 is formed.

On the second side 3212 of the annular bearing portion 321 of the sleeve element 32 there is provided a receptacle 323 for the spring element 33. The receptacle 323 for example is formed as an annular groove. In the annular groove (as shown in FIG. 7) one or more pins 3231 moreover can be formed, which fix the spring element 33 in the annular groove, for example by clamping the spring element 33 between an inner wall of the annular groove and the pin(s) 3231. Alternatively, the pins 3231 can be formed and arranged such that they protrude into correspondingly provided receptacles of the spring element 33 so that in the plane which is defined by the annular groove the spring element 33 is stationary with respect to the annular groove. The spring element 33 for example is a coil spring. In the properly arranged state, the spring element 33 is arranged between the second side 3212 of the annular bearing portion 321 of the sleeve element 32 and the steering wheel element (the steering wheel hub 13).

With its end facing away from the central cylindrical portion 322 the annular bearing portion 321 of the sleeve element 32 protrudes into a groove 316 which is formed in the elastic bearing element 31 to receive the sleeve element 32. Thus, the sleeve element 32 and the elastic bearing element 31 can be connected to each other.

In the properly arranged state, the fastening means 34, which in the embodiment of FIG. 6 is designed as a screw, extends through the central portion 322 of the sleeve element 32 and protrudes beyond both (opposite) ends of the sleeve element 32. In this way, the screw with its thread can engage into a corresponding thread of the steering wheel element (steering wheel hub 13). With its head, the screw rests against the end of the pins 3131 (facing away from the annular bearing portion 311 of the elastic bearing element 31). Hence, the fastening means 34 sectionally rests against the elastic bearing element 31. The fastening means 34 (concretely, the head of the screw) exerts a compressive force on the elastic bearing element 31, which is directed along the axis A. Depending on the position of the fastening means 34, the compressive force acting on the elastic bearing element 31 can be adjusted. Due to the elasticity of the material of the elastic bearing element 31, the same can also be compressed increasingly with increasing compressive force. In particular, the distance between the protrusions 3132 directed radially to the outside and the first side 3111 of the annular bearing portion 311 of the elastic bearing element 31 can be reduced with increasing compressive force, whereby the pressure exerted by the elastic bearing element 31 on the vibration damping mass (contact bridge 21 of the airbag module 2) rises. Thus, the contact pressure exerted on the vibration damping mass can be adjusted by shifting the fastening means 34.

The invention claimed is:

1. A vibration damper system for a steering wheel arrangement of a motor vehicle, which is provided for arrangement on a steering wheel element of the steering wheel arrangement, comprising
   a vibration damping mass for damping the vibration of the steering wheel arrangement,
   an elastic bearing element which comprises a fastening element for fastening the elastic bearing element to the one of the steering wheel element and the vibration damping mass, and
   a fastening means for fastening to the other of the steering wheel element and the vibration damping mass, wherein the elastic bearing element sectionally rests against the fastening means,
   wherein the elastic bearing element comprises an annular bearing portion whose first side faces the one of the vibration damping mass and the steering wheel element and whose second side, which is disposed opposite the first side, faces the other of the vibration damping mass and the steering wheel element, wherein the fastening element is formed on the first side of the annular bearing portion,
   wherein the fastening element comprises a plurality of pins which are arranged along the circumferential edge of the annular bearing portion and each protrude from the first side of the annular bearing portion along an axis from the annular bearing portion, wherein each pin has a protrusion directed radially to the outside with respect to the axis,
   wherein in addition to the elastic bearing element a sleeve element is provided, which extends along a main axis of extension of the sleeve element and which includes an annular bearing portion that extends in a plane perpendicular to the main axis of extension of the sleeve element and that has a first side and a second side opposite the first side,
   wherein in the intended state the first side of the annular bearing portion of the sleeve element rests against the second side of the annular bearing portion of the elastic bearing element,
   wherein the pins of the elastic bearing element protrude beyond a central cylindrical portion of the sleeve element,
   wherein a compressive force exerted on the steering wheel element to be fastened or the vibration damping mass to be fastened by the annular bearing portion of the elastic bearing element and by the radially outwardly directed protrusions of the elastic bearing element can be adjusted by the fastening means,
   wherein on the second side of the annular bearing portion of the sleeve element there is provided a receptacle for a spring element, with one or more pins inside the receptacle for fixing the spring element.

2. The vibration damper system according to claim 1, wherein in the intended state the elastic bearing element on the one hand rests against the first side of the annular bearing portion of the sleeve element and on the other hand against the fastening means, wherein the elastic bearing element exerts a compressive force on the first side of the annular bearing portion of the sleeve element and on the fastening means.

3. The vibration damper system according to claim 1, wherein the pins are configured to protrude through an opening in the vibration damping mass or the steering wheel element, and the protrusions directed radially to the outside are configured to engage behind the vibration damping mass or the steering wheel element.

4. The vibration damper system according to claim 1, wherein in the intended state the sleeve element extending along the axis does not extend beyond the end of the pins of the elastic bearing element facing away from the annular bearing portion of the elastic bearing element.

5. The vibration damper system according to claim 2, wherein the elastic bearing element can be fastened to the steering wheel element or to the vibration damping mass by clamping the steering wheel element or the vibration damping mass between the annular bearing portion of the elastic bearing element and the radially outwardly directed protrusions of the elastic bearing element.

6. The vibration damper system according to claim 1, wherein the elastic bearing element includes an opening which is surrounded by the annular bearing portion and which forms a feed-through opening from the first side to the second side of the annular bearing portion.

7. The vibration damper system according to claim 6, wherein in the intended state the sleeve element extends along the axis and protrudes through the opening of the elastic bearing element.

8. The vibration damper system according to claim 1, wherein the elastic bearing element with its fastening element is manufactured in one piece from an elastic material.

9. The vibration damper system according to claim 1, wherein the sleeve element is formed in one piece.

10. The vibration damper system according to claim 1, wherein the vibration damper system comprises a spring element which in the intended state is arranged between the second side of the annular bearing portion of the sleeve element and the vibration damping mass or the steering wheel element.

* * * * *